United States Patent
Hong et al.

(10) Patent No.: US 9,593,236 B2
(45) Date of Patent: Mar. 14, 2017

(54) PREPARATION METHOD OF THERMOPLASTIC RESIN COMPOSITION AND THERMOPLASTIC RESIN COMPOSITION PREPARED THEREFROM

(71) Applicant: Samsung SDI Co., Ltd., Yongin-si (KR)

(72) Inventors: Jae Keun Hong, Uiwang-si (KR); Beom Ho Kim, Uiwang-si (KR); Jun Hong Park, Uiwang-si (KR); Ki Bo Chang, Uiwang-si (KR); Sung Hun Kim, Uiwang-si (KR); Gwang Hwan Lee, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/583,986

(22) Filed: Dec. 29, 2014

(65) Prior Publication Data
US 2015/0183981 A1   Jul. 2, 2015

(30) Foreign Application Priority Data

Dec. 31, 2013  (KR) .................. 10-2013-0168918

(51) Int. Cl.
| | |
|---|---|
| *B29B 7/42* | (2006.01) |
| *B29B 7/84* | (2006.01) |
| *C08L 55/02* | (2006.01) |
| *C08L 33/20* | (2006.01) |
| *B29B 7/00* | (2006.01) |
| *B29B 7/60* | (2006.01) |
| *B29B 7/72* | (2006.01) |
| *B29C 47/76* | (2006.01) |
| *C08L 25/12* | (2006.01) |
| *B29K 77/00* | (2006.01) |
| *B29K 55/02* | (2006.01) |
| *B29B 7/46* | (2006.01) |
| *B29B 9/06* | (2006.01) |
| *B29B 9/16* | (2006.01) |
| *B29C 47/00* | (2006.01) |
| *B29C 47/10* | (2006.01) |
| *B29K 25/00* | (2006.01) |

(52) U.S. Cl.
CPC ............. *C08L 33/20* (2013.01); *B29B 7/007* (2013.01); *B29B 7/60* (2013.01); *B29B 7/72* (2013.01); *B29B 7/845* (2013.01); *B29B 7/847* (2013.01); *B29C 47/767* (2013.01); *C08L 25/12* (2013.01); *B29B 7/42* (2013.01); *B29B 7/46* (2013.01); *B29B 9/06* (2013.01); *B29B 2009/168* (2013.01); *B29C 47/0004* (2013.01); *B29C 47/1081* (2013.01); *B29K 2025/08* (2013.01); *B29K 2055/02* (2013.01); *B29K 2077/10* (2013.01); *C08L 2205/02* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 4,690,975 A * | 9/1987 | Sugimori | ................ C08J 3/005 525/100 |
| 5,852,113 A | 12/1998 | Guntherberg et al. | |
| 5,910,276 A | 6/1999 | Guntherberg et al. | |
| 2015/0316321 A1 * | 11/2015 | Tucker | ..................... B30B 9/16 526/295 |

FOREIGN PATENT DOCUMENTS

| | | |
|---|---|---|
| JP | 09-187818 A | 7/1997 |
| JP | 11-129319 A | 5/1999 |
| JP | 2007-023182 A | 2/2007 |
| JP | 2008-238626 A | 10/2008 |
| KR | 10-0371887 B1 | 3/2003 |
| KR | 10-0371072 B1 | 4/2003 |
| KR | 10-2011-0054574 A | 5/2011 |

* cited by examiner

*Primary Examiner* — Jeffrey Mullis
(74) *Attorney, Agent, or Firm* — Additon, Higgins & Pendleton, P.A.

(57) ABSTRACT

Provided are a preparation method of a thermoplastic resin composition and a thermoplastic resin composition prepared therefrom. The preparation method includes: feeding a first thermoplastic resin in a molten state into a first hopper and feeding an impact reinforcing agent including a predetermined content of moisture into a second hopper, followed by kneading and extruding processes, and removing the moisture in a first vent port and a second vent port, wherein the first hopper, the first vent port, the second hopper, a first kneading zone, and the second vent port are sequentially formed in a moving direction of an extruder. The thermoplastic resin composition prepared therefrom can have improved appearance property and improved color property by removing moisture of an impact reinforcing agent added to the thermoplastic resin composition.

8 Claims, 1 Drawing Sheet

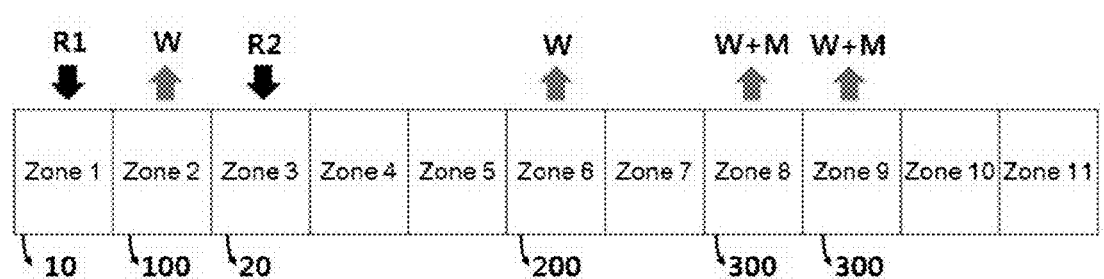

PREPARATION METHOD OF THERMOPLASTIC RESIN COMPOSITION AND THERMOPLASTIC RESIN COMPOSITION PREPARED THEREFROM

CROSS-REFERENCE TO RELATED APPLICATIONS

This application claims priority under 35 U.S.C. §119 to Korean Patent Application No. 10-2013-0168918, filed on Dec. 31, 2013, in the Korean Intellectual Property Office, the disclosure of which is incorporated herein by reference in its entirety.

FIELD OF THE INVENTION

The following disclosure relates to a method of preparing a thermoplastic resin composition and a thermoplastic resin composition prepared therefrom.

BACKGROUND

In general, acrylonitrile-butadiene-styrene copolymer (ABS) resins have been widely used in various applications such as vehicles, electrical and electronic components, office equipment, home appliances, toys, office supplies, and the like, due to impact resistance of butadiene, moldability and colorability of styrene, and physical properties such as rigidity, chemical resistance, and the like, and an aesthetic appearance property of acrylonitrile.

As a general method of preparing the ABS resin, a kneading and extruding process (a compounding process) preparing the ABS resin has been used, wherein the compounding process includes preparing grafted ABS (g-ABS) obtained by emulsion polymerization of butadiene and addition of styrene and acrylonitrile thereto, and kneading and extruding the obtained g-ABS together with a styrene-acrylonitrile copolymer (SAN) resin in an extruder.

In addition, a bulk-suspension process preparing the ABS resin by bulk-polymerizing butadiene, styrene, and acrylonitrile at the first stage, and after a phase-conversion step, changing the bulk-polymerized mixture into a suspension-polymerization state, and a mass-continuous process preparing the ABS resin by feeding all monomer raw materials at the first stage, followed by bulk-polymerization have been widely known and used.

The bulk-suspension process has advantages in that since only one reactor is used, the prepared resin has stable physical properties and operation cost and energy consumption are low; however, the bulk-suspension process has disadvantages in that it is not suitable for mass-production.

In addition, the mass-continuous process has advantages in that it is suitable for mass-production; however, the mass-continuous process has disadvantages in that it is not easy to control physical properties of an impact reinforcing agent used in the resin, and as a result, it has a limitation in manufacturing various products.

A kneading and extruding process which is the most widely used until recently uses a relatively simple manufacturing apparatus, and uses g-ABS particles having a small average particle size prepared by a batch type emulsion polymerization, such that a high glossy ABS resin is capable of being prepared and a mixing ratio of raw materials in a kneading and extruding step may be easily changed, thereby being advantageous for controlling the physical properties of the ABS resin. However, when the g-ABS particles are prepared by the emulsion polymerization, an agglomerating process, a washing process, a dewatering process, a drying process, and the like, should be performed, and then a feeding process into an extruder is also needed. In this case, excessive energy is consumed in the dewatering and drying processes, and the g-ABS particles tend to agglomerate, which form a gel spot, causing a problem in that the ABS resin has a poor appearance. In addition, in order to pulverize and disperse the agglomerated g-ABS particles, an extruder having a screw with a strong kneading element is used; however, in this case, discoloration of the ABS resin badly occurs.

Korean Patent No. 0371072 and Korean Patent No. 0371887 disclose a preparation method of an impact reinforced thermoplastic resin composition including supplying an impact reinforcing elastomer containing moisture to a twin-screw extruder, removing the moisture by a compression unit, and mixing with a matrix thermoplastic resin. However, in this case, loss of raw materials occurred while the moisture was removed by the compression unit, and additional processes such as heating, and the like, were required, such that energy consumption was remarkably increased. Accordingly, there were problems that overall preparation cost is increased, and appearance property may be deteriorated and discoloration may be increased due to the increase in the energy consumption of the extruder.

Therefore, there is a need for a method of preparing a thermoplastic resin composition having improved appearance, excellent discoloration resistance to improve color appearance, and a low gel content, that can be prepared with reduced load on an extruder motor to reduce energy consumption.

SUMMARY

An embodiment of the present invention is directed to providing a preparation method of a thermoplastic resin composition having a low gel content and improved discoloration resistance which can significantly decrease energy consumption per unit. For example, according to exemplary embodiments of the preparation method of the thermoplastic resin composition, when a first thermoplastic resin in a molten state is fed into the first hopper, and an impact reinforcing agent containing moisture is fed into the second hopper, the thermoplastic resin composition passes through the first vent port positioned between the first hopper and the second hopper, and the second vent port positioned right after the first kneading zone, such that the moisture present in the thermoplastic resin composition may be removed, and energy consumption per unit in an extruder may be remarkably decreased, whereby the preparation cost may be reduced.

In addition, another embodiment of the present invention is directed to providing a thermoplastic resin composition having a low content of gel and improved discoloration resistance, prepared by the above-described preparation method.

In exemplary embodiments, there is provided a preparation method of a thermoplastic resin composition including: feeding a first thermoplastic resin in a molten state into the first hopper and feeding an impact reinforcing agent including moisture into the second hopper, followed by kneading and extruding processes, and removing the moisture in the first vent port and the second vent port, wherein the first hopper, the first vent port, the second hopper, the first kneading zone, and the second vent port are sequentially formed in a moving direction of an extruder.

The first vent port may be an opened vent without another apparatus, and the second vent port may be provided with an apparatus selectively extracting steam only.

A moisture content W1 removed in the first vent port and a moisture content W2 removed in the second vent port may have a weight ratio (W1/W2) of about 0.5 to about 25.

A moisture content removed in the first vent port may correspond to about 60 to about 90 wt % of the total moisture content, and a moisture content removed in the second vent port may correspond to about 10 to about 40 wt % of the total moisture content.

The first thermoplastic resin may be an aromatic vinyl-vinyl cyanide-based copolymer, and the impact reinforcing agent may be a rubber-modified vinyl-based graft copolymer.

The first thermoplastic resin may include a styrene-acrylonitrile copolymer, an α-methyl styrene-acrylonitrile copolymer, and/or a styrene-α-methyl styrene-acrylonitrile copolymer, and the impact reinforcing agent may include acrylonitrile-butadiene-styrene graft copolymer (g-ABS) obtained by graft copolymerization with about 30 to about 70 wt % of a mixture including a styrene and an acrylonitrile in the presence of about 30 to about 70 wt % of a polybutadiene rubber, using emulsion polymerization.

The second kneading zone and the third vent port may be further formed after the second vent port, and the third vent port may include a vacuum vent, and can remove at least one selected from the group consisting of residual water, unreacted monomers, oligomers, and decomposition gases.

In other exemplary embodiment, there is provided a thermoplastic resin composition prepared by the preparation method as described above.

The thermoplastic resin composition may satisfy the following Equations 1 and 2:

$$10 \leq Gel \leq 10,000 \quad \text{[Equation 1]}$$

$$5 \leq YI \leq 15 \quad \text{[Equation 2]}$$

(In the Equation 1, Gel means the number of gel spots detected by scanning a predetermined section of an extruded sheet, and in the Equation 2, YI means yellow index (%) of the extruded sheet).

BRIEF DESCRIPTION OF THE DRAWINGS

FIG. 1 shows a schematic structure of an extruder for preparation of a thermoplastic resin composition according to an exemplary embodiment of the present invention.

[Detailed Description of Main Elements]

| | |
|---|---|
| 10: FIRST HOPPER | 20: SECOND HOPPER |
| 100: FIRST VENT PORT | |
| 200: SECOND VENT PORT | 300: THIRD VENT PORT |
| R1: FIRST THERMOPLASTIC RESIN IN MOLTEN STATE | |
| R2: IMPACT REINFORCING AGENT CONTAINING MOISTURE | |
| W: MOISTURE (STEAM) | |
| M: UNREACTED MONOMER, OLIGOMER, VOLATILE MATERIAL | |

DETAILED DESCRIPTION OF EMBODIMENTS

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Hereinafter, a preparation method of a thermoplastic resin composition of the present invention and a thermoplastic resin composition prepared therefrom will be described in detail. The exemplary embodiments of the present invention to be described below are provided by way of example so that the idea of the present invention can be sufficiently transferred to those skilled in the art to which the present invention pertains. Herein, unless technical and scientific terms used herein are defined otherwise, they have meanings understood by those skilled in the art to which the present invention pertains. Known functions and components which obscure the description and the accompanying drawings of the present invention with unnecessary detail will be omitted.

As a result of research to develop a preparation method of a thermoplastic resin composition decreasing energy consumption per unit and having a low gel content and improved discoloration resistance, the present inventors found that when a first thermoplastic resin in a molten state is fed into the first hopper, and an impact reinforcing agent containing moisture is fed into the second hopper, the moisture present in the thermoplastic resin composition may be effectively removed by passing through the first vent port and the second vent port, such that a load applied to an extruder motor may be reduced, the prepared thermoplastic resin composition may have a low gel content, and discoloration resistance such as yellow index, or the like, may be improved, thereby completing the present invention.

The preparation method of a thermoplastic resin composition of the present invention includes: feeding a first thermoplastic resin in a molten state into the first hopper and feeding an impact reinforcing agent including moisture into the second hopper, followed by kneading and extruding processes, and removing the moisture in the first vent port and the second vent port, wherein the first hopper, the first vent port, the second hopper, the first kneading zone, and the second vent port are sequentially formed in a moving direction of an extruder.

Hereinafter, each component will be described in more detail.

(A) First Thermoplastic Resin

The first thermoplastic resin according to an exemplary embodiment of the present invention is an aromatic vinyl-vinyl cyanide-based copolymer. The aromatic vinyl-vinyl cyanide-based copolymer, which is to improve impact strength and moldability, may be a copolymer of an aromatic vinyl-based compound and a vinyl cyanide-based compound.

The aromatic vinyl-vinyl cyanide-based copolymer may be prepared by methods known in the art, and for example, may be prepared by polymerizing a monomer mixture including about 50 to about 95 wt % of the aromatic vinyl-based compound and about 5 to about 50 wt % of the vinyl cyanide-based compound. In addition, the aromatic vinyl-vinyl cyanide-based copolymer may be prepared by polymerization of a mixture obtained by selectively further adding an organic solvent to the monomer mixture; however, the present invention is not limited thereto.

For example, according to the preparation method of the aromatic vinyl-vinyl cyanide-based copolymer, the mixture can be continuously fed into the first reactor among a plurality of reactors disposed in series to produce the first copolymer having a solid content of about 20 to about 50 wt %, wherein a residence time of the first reactor may be about 0.5 to about 3 hours, but is not limited thereto, and a polymerization temperature thereof may be about 100 to about 160° C., but is not limited thereto. The prepared first copolymer can be fed into the second reactor for further reaction, thereby preparing the second copolymer having a solid content of about 30 to about 90 wt %. Here, a residence time of the second reactor may be about 1 to about 3 hours, and a polymerization temperature thereof may be about 110 to about 170° C.; however, the present invention is not limited thereto. The prepared second copolymer can be continuously fed into a devolatilization bath at a high temperature and a vacuum state to separate a non-reacted product from the finally prepared copolymer, and then the obtained product in a molten state may be fed into an extruder.

In addition, after the separation of the non-reacted material from the final copolymer, the obtained product may be prepared as a pellet form by a pelletizer, and the like.

Examples of the aromatic vinyl-based compound may include without limitation styrene, $C_1$ to $C_{10}$ alkyl-substituted styrene, halogen-substituted styrene, vinyl toluene, vinyl naphthalene, and the like, and combinations thereof.

Examples of the alkyl-substituted styrene may include without limitation α-methyl styrene, p-methyl styrene, o-ethyl styrene, m-ethyl styrene, p-ethyl styrene, p-t-butyl styrene, 2,4-dimethyl styrene, and the like, and combinations thereof.

Examples of the vinyl cyanide-based compound may include without limitation acrylonitrile, methacrylonitrile, fumaronitrile and the like, and combinations thereof.

Examples of the aromatic vinyl-vinyl cyanide-based copolymer may include without limitation a styrene-acrylonitrile copolymer; an α-methyl styrene-acrylonitrile copolymer; and/or a styrene-α-methyl styrene-acrylonitrile copolymer. In exemplary embodiments, the styrene-acrylonitrile copolymer may be used.

In addition, the aromatic vinyl-vinyl cyanide-based copolymer of the present invention may further selectively include an ethylenically unsaturated monomer. Accordingly, physical properties such as moldability, heat resistance, and the like, may be improved.

Examples of the ethylenically unsaturated monomer may include without limitation aromatic and/or alkyl esters of acrylic acids and/or methacrylic acids such as $C_1$ to $C_4$ alkyl methacrylates such as methyl methacrylate, $C_1$ to $C_4$ alkyl acrylates, phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate, and the like, N-substituted maleimides such as N-methylmaleimide, N-phenylmaleimide and N-cyclohexylmaleimide, and the like, a maleic acid, a fumaric acid, an itaconic acid, and their anhydrides, nitrogen-functional monomers such as a nitrogen-functional methacrylic acid, a nitrogen-functional dicarboxylic acid, for example, dimethylaminoethyl acrylate, diethylaminoethyl acrylate, vinylimidazole, vinylpyrrolidone, vinylcaprolactam, vinylcarbazole, vinylaniline, acrylamide, methacrylamide, and the like, and combinations thereof.

The organic solvent is not limited as long as it is an organic solvent used in polymerization of the thermoplastic resin known in the art. For example, toluene and/or ethylbenzene, and the like, can be used since they are easily recovered under a vacuum condition after polymerization, and heat of reaction generated during the polymerization reaction may be effectively controlled.

(B) Impact Reinforcing Agent

An impact reinforcing agent according to an exemplary embodiment of the present invention, which is a rubber-modified vinyl-based graft copolymer, may improve impact resistance and appearance of the thermoplastic resin composition.

The impact reinforcing agent of the present invention may be a rubber-modified vinyl-based graft copolymer having a core-shell structure in which a core is a rubber-like polymer and a shell includes an aromatic vinyl-based compound and a vinyl cyanide-based compound. The impact reinforcing agent may be prepared by graft copolymerization of a mixture including the rubber-like polymer, the aromatic vinyl-based compound and the vinyl cyanide-based compound. The polymerization method is not limited and conventional methods known in the art can be used, for example, may include a bulk polymerization, a suspension polymerization and an emulsion polymerization.

As an example thereof, the impact reinforcing agent may be prepared by graft copolymerization with about 30 to about 70 wt % of a mixture including an aromatic vinyl-based compound and a vinyl cyanide-based compound in the presence of about 30 to about 70 wt % of a rubber-like polymer, using emulsion polymerization.

For example, the impact reinforcing agent may be prepared using a rubber-like polymer, an aromatic vinyl-based compound, a vinyl cyanide-based compound, an initiator, an emulsifier, a chain transfer agent and a reducing agent. The rubber-like polymer, about 35 wt % of the previously prepared mixture including the aromatic vinyl-based compound and the vinyl cyanide-based compound, and water in an amount corresponding to about 1 to 2 times the total weight of the monomers used in the copolymerization can be fed into a polymerization reactor and stirred while a temperature of the polymerization reactor is raised to be about 50 to about 70° C. When the temperature of the polymerization reactor reaches a predetermined temperature, a primary polymerization may be performed by a redox polymerization.

After the primary polymerization, the temperature of the polymerization reactor can be raised to be about 60 to about 80° C., and then a secondary polymerization may be performed by slowly adding drop-wise a residual amount (about 65 wt %) of the mixture including the aromatic vinyl-based compound and the vinyl cyanide-based compound, an initiator, a chain transfer agent, and the like, for about 100 to about 150 minutes.

After the secondary polymerization, non-reacted monomers can be polymerized so that the final product includes non-reacted monomer in an amount of less than about 3.0 wt % while the temperature of the polymerization reactor is maintained at about 60 to about 80° C., thereby obtained a final product in a latex form.

A sulfuric acid can be added drop-wise into the latex to form slurry particles, followed by washing and dewatering processes, such that the impact reinforcing agent having moisture may be prepared.

An apparatus used in the dewatering process is not limited as long as it is a dewatering apparatus known in the art, and for example, a single dewatering screw press may be used.

The impact reinforcing agent after the washing and dewatering processes may have moisture content of about 5 to about 40 wt %, for example, about 7 to about 20 wt %.

When the moisture content of the impact reinforcing agent is less than about 5 wt %, unnecessary time for removing the moisture and energy consumption can be increased. When the moisture content of the impact reinforcing agent is more than about 40 wt %, at the time of preparing the thermoplastic resin composition, non-uniform kneading between the impact reinforcing agent and the first thermoplastic resin can occur, productivity can be remarkably decreased, and a load of the extruder can be increased, which also can increase energy consumption.

The rubber-like polymer may have an average particle size (d50) of about 0.1 to about 1.0 μm. In exemplary embodiments, the average particle size can be about 0.2 to about 0.6 μm, which can improve impact resistance and compatibility.

When the average particle size thereof is less than about 0.1 μm, mechanical properties may be slightly increased but low-temperature impact strength may be remarkably decreased. When the average particle size thereof is more than about 1.0 μm, desired impact strength may not be achieved.

Examples of the rubber-like polymer according to an exemplary embodiment of the present invention may include without limitation polybutadiene rubbers, acrylic rubbers, ethylene/propylene rubbers, styrene/butadiene rubbers, acrylonitrile/butadiene rubbers, polyisoprene rubbers, ethylene-propylene-diene terpolymers (EPDM), polyorganosiloxane/polyalkyl(meth)acrylate rubber composites, and the like, and mixtures of two or more selected therefrom. In exemplary embodiments, polybutadiene rubber may be used.

Examples of the aromatic vinyl-based compound in the mixtures graft copolymerized with the rubber-like polymer may include without limitation styrene, $C_1$ to $C_{10}$ alkyl-substituted styrene, halogen-substituted styrene, vinyl toluene, vinyl naphthalene, and the like, and combinations thereof. Examples of the $C_1$ to $C_{10}$ alkyl-substituted styrene may include without limitation α-methyl styrene, p-methyl styrene, o-ethyl styrene, m-ethyl styrene, p-ethyl styrene, p-t-butyl styrene, 2,4-dimethyl styrene, and the like, and combinations thereof. In exemplary embodiments, the aromatic vinyl-based compound may include styrene.

Examples of the vinyl cyanide-based compound in the mixtures graft copolymerized with the rubber-like polymer may include without limitation acrylonitrile, methacrylonitrile, fumaronitrile, and the like, and combinations thereof. In exemplary embodiments, the vinyl cyanide-based compound may include acrylonitrile.

One or more additives such as an emulsifier, an initiator, a chain transfer agent, and the like, as known in the art for use in the emulsion polymerization may be used without limitation. For example, a rosin acid-based emulsifier, a peroxide-based initiator, a mercapto-based chain transfer agent, and the like, may be used.

The thermoplastic resin composition of the present invention may further contain one or more general additives depending on a desired usage, in addition to the above-described components. Examples of the additives may include without limitation antibacterial agents, heat stabilizers, antioxidants, release agents, light stabilizers, inorganic additives, surfactants, coupling agents, plasticizers, compatibilizers, lubricants, anti-static agents, colorants such as pigments and/or dyes, flame retardants, flame retardant aids, anti-dripping agents, weather resistant agents, ultraviolet absorbers, sunscreens, and the like, and mixtures thereof.

The thermoplastic resin composition of the present invention may be prepared by methods known in the art. For example, each component and optional additive(s) can be mixed by a Henschel mixer, a V blender, a tumbler blender, a ribbon blender, and the like, followed by melt-extrusion using a single screw extruder or a twin-screw extruder at a temperature of about 150 to about 300° C., thereby preparing the mixture as a pellet form. For example, the thermoplastic resin composition may be prepared as the pellet form by extrusion under conditions including a temperature of about 150 to about 300° C., a screw rotation rate of about 300 to about 600 rpm, and a feeding rate of about 60 to about 600 kg/hr, using a twin-screw extruder with L/D of about 20 to about 60 and ϕ of about 32 to about 70 mm.

FIG. 1 shows a structure of an extruder for preparation of the thermoplastic resin composition according to an exemplary embodiment of the present invention.

Referring to FIG. 1, the first thermoplastic resin in a molten state may be fed into a first hopper (10) and the impact reinforcing agent containing moisture may be fed into a second hopper (20). Here, at the time of the first-feeding or the second-feeding, the first thermoplastic resin in a pellet form may be fed together thereinto.

In addition, the first vent port (100) may be present between the first hopper (10) and the second hopper (20), and may be an opened vent without a separate apparatus installed therein. A size of the opened vent can be variably controlled, such that the moisture content to be removed may be adjusted. The skilled artisan will understand from this disclosure the types of vent systems, which are commercially available, appropriate for use as the first vent port (100).

The first hopper (10), the first vent port (100), and the second hopper (20) are sequentially formed in a moving direction of an extruder, such that the moisture contained in the secondly fed impact reinforcing agent may be easily evaporated due to a temperature of the firstly fed first thermoplastic resin in a molten state. Therefore, energy consumption of the extruder may be reduced to reduce a load of the motor, such that the prepared thermoplastic resin composition may have improved discoloration resistance such as yellow index, or the like.

In FIG. 1, a part marked by ZONE 4 and ZONE 5 means a first kneading zone, wherein the first thermoplastic resin and the impact reinforcing agent from which moisture is partially removed are subjected to a uniform kneading process. Detailed conditions of the kneading zone such as the screw rotation rate, the barrel temperature, the shape and the number of the kneading block, and the like, are not limited and can be conventional conditions known in the art.

The second vent port (200) according to an exemplary embodiment of the present invention may be positioned right after the first kneading zone. The second vent port (200) is to remove the moisture remaining in the uniformly kneaded thermoplastic resin composition, and it is effective for the second vent port to have an apparatus of not allowing the thermoplastic resin composition to pass through but selectively extracting steam only. Again, the skilled artisan will understand from this disclosure the types of vent systems, which are commercially available, appropriate for use as the secondary vent section 200.

A moisture content W1 removed in the first vent port and a moisture content W2 removed in the second vent port have a weight ratio (W1/W2) of about 0.5 to about 25, for example, about 1.0 to about 25.

In addition, the moisture content removed in the first vent port may correspond to about 60 to about 90 wt % of the total moisture content, and the moisture content removed in the second vent port may correspond to about 10 to about 40 wt % of the total moisture content.

When W1/W2 is less than about 0.5 or the moisture content removed in the first vent port is less than about 60 wt %, the moisture may not be sufficiently removed in the first vent port, such that the uniform kneading process may not be performed, and at the time of venting, overflow may occur which may reduce productivity. In addition, when W1/W2 is more than about 25 or the moisture content removed in the first vent port is more than about 90 wt %, energy consumption can be unnecessarily increased, and the gel content and yellow index of the thermoplastic resin composition can be increased, such that physical properties thereof may be deteriorated.

The moisture content removed in the first vent port and the second vent port may be calculated by condensing the steam removed in each vent port as water by a condensation apparatus, measuring weight of the condensed water, and comparing the measured weight with an initial moisture content of the impact reinforcing agent initially fed into the second hopper.

According to an exemplary embodiment of the present invention, the preparation method may further include a second kneading zone and a third vent port after the second vent port. A vacuum vent known in the art may be used in the third vent port; however, the present invention is not limited thereto. The third vent port may remove at least one selected from the group consisting of residual water, unreacted monomers, oligomers, and decomposition gases.

According to another exemplary embodiment of the present invention, there is provided a thermoplastic resin composition prepared by the above-described preparation method of the thermoplastic resin composition.

The thermoplastic resin composition of the present invention may satisfy the following Equations 1 and 2:

$$10 \leq Gel \leq 10{,}000 \quad \text{[Equation 1]}$$

$$5 \leq YI \leq 15 \quad \text{[Equation 2]}$$

(In the Equation 1, Gel means the number of gel spots detected by scanning a predetermined section of an extruded sheet, and in the Equation 2, YI means yellow index (%) of the extruded sheet).

According to the preparation method of the present invention, the thermoplastic resin composition having a low content of gel and excellent discoloration resistance such as yellow index, or the like, and remarkably decreasing energy consumption per unit to reduce the overall preparation cost to have excellent physical properties, may be provided.

Hereinafter, the following Examples will be provided in order to describe the present invention in more detail. However, the present invention is not limited to these Examples.

Measurement of Physical Properties

1) Measurement of Specific Energy Consumption (SEC) (Unit: kW-hr/kg)

Energy consumption of the extruder motor with respect to an output during the extrusion process is measured based on the following Calculation Formula:

The maximum motor capacity*torque load factor* (driving rpm/max rpm)/output   [Calculation Formula]

2) Measurement of Gel Spot (Unit: The Number)

A thermoplastic resin composition sheet is prepared by a single screw extruder having L/D of 25, φ of 20 mm and a 100 mm×0.5 mm slot die. The extruded sheet is scanned at a rate of 5 m/min for three minutes by a Collin film inspection compact system, then the number of gel spots to be detected is measured.

3) Measurement of Yellow Index (YI) (Unit: %)

Yellow Index is measured by a color-difference meter (ND-1001 DP) manufactured by Nippon Denshoku Kogyo Co., LTD., based on ASTM D1925 standard.

4) Measurement of IZOD Impact Strength (Unit: kgf·cm/cm)

IZOD impact strength is measured under a notched condition with about ⅛" thickness, based on ASTM D256 standard.

5) Measurement of Melt-Flow Index (MI) (Unit: g/10 min)

MI is measured at 220° C. and 10 kg based on ISO 1133 standard.

6) Measurement of Process Status

A case where overflow of the resin composition occurs in the vent port during the extrusion process, that is, the occurrence of the overflow is shown by "x", and the non-occurrence of the overflow is shown by "○".

Specifications of each component used in the following Examples and Comparative Examples are as follows.

(A1) First Thermoplastic Resin

A styrene-acrylonitrile copolymer (SAN) resin obtained by copolymerization of about 25 wt % of acrylonitrile and about 75 wt % of styrene is used, wherein the SAN resin is used as molten state.

(A2) First Thermoplastic Resin

A styrene-acrylonitrile copolymer (SAN) resin obtained by copolymerization of about 25 wt % of acrylonitrile and about 75 wt % of styrene is used, wherein the SAN resin is used as a pellet form.

(B1) Impact Reinforcing Agent

A g-ABS resin having a core-shell structure obtained by emulsion graft copolymerization of 58 wt % of polybutadiene rubber having an average particle size of about 0.25 μm with styrene and acrylonitrile is dewatered so as to have a moisture content of about 13 wt % by a dewatering screw press (DSP) manufactured by Shin Seong Plant Company.

(B2) Impact Reinforcing Agent

A g-ABS resin having a core-shell structure obtained by emulsion graft copolymerization of 58 wt % of polybutadiene rubber having an average particle size of about 0.25 μm with styrene and acrylonitrile is dewatered so as to have a moisture content of about 10 wt % by a dewatering screw press (DSP) manufactured by Shin Seong Plant Company.

(B3) Impact Reinforcing Agent

A g-ABS resin having a core-shell structure obtained by emulsion graft copolymerization of 58 wt % of polybutadiene rubber having an average particle size of about 0.25 μm with styrene and acrylonitrile is dewatered so as to have a moisture content of about 20 wt % by a centrifugal dehydrator, and then dried for 60 minutes by a fluidized bed dryer, thereby preparing powders having a moisture content of less than about 1 wt % to be used.

EXAMPLE 1

As shown in the following Table 1, about 78 wt % of the first thermoplastic resin (A1) in a molten state is fed into the first hopper (10) of the twin-screw extruder having L/D=35 and 0=45 mm and having a structure shown in FIG. 1, and the impact reinforcing agent (B1) having a moisture content of about 13 wt % is fed into the second hopper (20), followed by extruding and kneading processes, thereby preparing the mixture as a pellet form. A size of the first vent port (100) is controlled so that the content of the moisture to be removed corresponds to about 63 wt % of the moisture to be fed. The moisture content removed in the first vent port is calculated by condensing the moisture as water by a condensation apparatus connected to the firstly vent and measuring weight of the condensed water. The residual moisture is removed through the second vent port (200) and the removed moisture content is calculated by the same method as the calculation of the moisture content removed in the firstly vent. Then, the reacted product is additionally kneaded through the second kneading zone installed in ZONE 7, and monomers remaining are removed through the third vent port, thereby preparing the final pellet as a product. A temperature of a barrel is set to be about 220° C.

Before injection molding, the prepared pellet is dried in a dehumidifying drier apparatus at about 80° C. for about 2 hours and then is prepared as a specimen for measuring physical properties by a 6 oz injection molding machine at an injection temperature of about 210° C. and at a mold temperature of about 50° C. The measured physical properties are shown in the following Table 2.

EXAMPLE 2

As shown in the following Table 1, a sample of Example 2 is prepared by the same method as Example 1 except that the moisture content removed in the first vent port (100) is adjusted to be about 79 wt %. Physical properties of the prepared specimens are measured and shown in the following Table 2.

EXAMPLES 3 AND 4

As shown in the following Table 1, samples of Examples 3 and 4 are prepared by the same method as Example 1 except that the impact reinforcing agent B2 is used, and the moisture content removed in the first vent port (100) is adjusted to be about 89 wt % and about 77 wt %, respectively. Physical properties of the prepared specimens are measured and shown in the following Table 2.

EXAMPLES 5 AND 6

As shown in the following Table 1, samples of Examples 5 and 6 are prepared by the same method as Example 1 except that the content of the first thermoplastic resin in a molten state A1 fed into the first hopper (10) is decreased, the first thermoplastic resin in a pellet form A2 is fed into the second hopper (20), and the moisture content removed in the first vent port (100) is adjusted to be about 62 wt % and about 88 wt %, respectively. Physical properties of the prepared specimens are measured and shown in the following Table 2.

EXAMPLE 7

As shown in the following Table 1, a sample of Example 7 is prepared by the same method as Example 1 except that the impact reinforcing agent B2 is used, and the moisture content removed in the first vent port (100) is adjusted to be about 82 wt %. Physical properties of the prepared specimens are shown in the following Table 2.

COMPARATIVE EXAMPLE 1

As shown in the following Table 1, a sample of Comparative Example 1 is prepared by the same method as Example 1 except that the first vent port (100) in the extruder is not used. Physical properties of the prepared specimens are shown in the following Table 2.

COMPARATIVE EXAMPLE 2

As shown in the following Table 1, a sample of Comparative Example 2 is prepared by the same method as Example 1 except that the second vent port (200) in the extruder is not used. Physical properties of the prepared sample are shown in the following Table 2.

COMPARATIVE EXAMPLE 3

As shown in the following Table 1, a sample of Comparative Example 3 is prepared by the same method as Example 1 except that the first vent port (100) and the second vent port (200) in the extruder are not used. Physical properties of the prepared sample are shown in the following Table 2.

COMPARATIVE EXAMPLE 4

As shown in the following Table 1, a sample of Comparative Example 4 is prepared by the same method as Example 1 except that the first thermoplastic resin in a pellet form A2 is fed into the first hopper (10), the impact reinforcing agent B1 is fed into the second hopper (20), and the moisture content removed in the first vent port (100) is adjusted to be about 78 wt %. Physical properties of the prepared sample are shown in the following Table 2.

COMPARATIVE EXAMPLE 5

As shown in the following Table 1, a sample of Comparative Example 5 is prepared by the same method as Example 1 except that the first thermoplastic resin in a pellet form A2 is fed into the first hopper (10), the impact reinforcing agent B3 is fed into the second hopper (20), and the first vent port (100) and the second vent port (200) in the extruder are not used. Physical properties of the prepared sample are shown in the following Table 2.

COMPARATIVE EXAMPLE 6

As shown in the following Table 1, a sample of Comparative Example 6 is prepared by the same method as Example 1 except that the first thermoplastic resin in a pellet form A2 and the impact reinforcing agent B1 are simultaneously fed into the second hopper (20), and the first vent port (100) and the second vent port (200) in the extruder are not used. Physical properties of the prepared sample are shown in the following Table 2.

TABLE 1

| | First hopper | | Second hopper | | | | Moisture Removal Content | | |
|---|---|---|---|---|---|---|---|---|---|
| | First Thermoplastic Resin (A1) | First Thermoplastic Resin (A2) | First Thermoplastic Resin (A2) | Impact Reinforcing Agent (B1) | Impact Reinforcing Agent (B2) | Impact Reinforcing Agent (B3) | First vent port | Second Vent | W1/W2 |
| Example 1 | 78 | — | — | 22 | — | — | 63 | 37 | 1.70 |
| Example 2 | 78 | — | — | 22 | — | — | 79 | 21 | 3.76 |
| Example 3 | 78 | — | — | — | 22 | — | 89 | 11 | 8.09 |
| Example 4 | 78 | — | — | — | 22 | — | 77 | 23 | 3.35 |
| Example 5 | 68 | — | 10 | 22 | — | — | 62 | 38 | 1.63 |
| Example 6 | 68 | — | 10 | 22 | — | — | 88 | 12 | 7.33 |
| Example 7 | 68 | — | 10 | — | 22 | — | 82 | 18 | 4.56 |
| Comparative Example 1 | 78 | — | — | 22 | — | — | — | 99 | — |
| Comparative Example 2 | 78 | — | — | 22 | — | — | 97 | — | — |
| Comparative Example 3 | 78 | — | — | 22 | — | — | — | — | — |
| Comparative Example 4 | — | 78 | — | 22 | — | — | 78 | 22 | 3.55 |
| Comparative Example 5 | — | 78 | — | — | — | 22 | — | — | — |
| Comparative Example 6 | — | — | 78 | — | — | 22 | — | — | — |

TABLE 2

| | SEC | Gel spot | YI | IZOD | MI | Process Status: Occurrence of Overflow |
|---|---|---|---|---|---|---|
| Example 1 | 0.109 | 2,020 | 10.1 | 19.1 | 2.4 | ○ |
| Example 2 | 0.112 | 1,990 | 10.3 | 18.7 | 2.4 | ○ |
| Example 3 | 0.112 | 1,830 | 10.2 | 19.0 | 2.3 | ○ |
| Example 4 | 0.108 | 1,590 | 10.7 | 18.6 | 2.5 | ○ |
| Example 5 | 0.116 | 1,440 | 11.6 | 18.8 | 2.4 | ○ |
| Example 6 | 0.117 | 2,190 | 11.1 | 18.9 | 2.4 | ○ |
| Example 7 | 0.115 | 2,200 | 11.3 | 19.2 | 2.3 | ○ |
| Comparative Example 1 | 0.117 | 17,230 | 10.9 | 18.9 | 2.5 | x |
| Comparative Example 2 | 0.114 | 3,270 | 11.4 | 19.3 | 2.4 | x |
| Comparative Example 3 | — | — | — | — | — | x |
| Comparative Example 4 | 0.162 | 6,430 | 13.2 | 19.3 | 2.3 | ○ |
| Comparative Example 5 | 0.164 | 23,210 | 16.1 | 19.4 | 2.2 | ○ |
| Comparative Example 6 | 0.154 | 26,200 | 16.4 | 19.1 | 2.4 | ○ |

It can be appreciated from Table 2 above that when the thermoplastic resin composition is prepared by the extruder having the first hopper, the first vent port, the second hopper, the first kneading zone, and the second vent port in a moving direction of the extruder like Examples 1 to 7 according to the present invention, the thermoplastic resin composition may have remarkably decreased energy consumption per unit, and a low content of gel, such that appearance property may be improved and discoloration resistance may be improved to provide excellent color property.

Meanwhile, when the first vent port did not exist like Comparative Example 1 above, the gel content is rapidly increased, and the overflow of the resin composition seriously occurred in the second vent port. It can be appreciated from the above-described results that when the moisture content removed in the first vent port is small, the similar result may occur.

In addition, it can be appreciated that when the second vent port did not exist like Comparative Example 2 above, the gel content is increased, and the overflow of the resin composition occurs in the third vent port.

Further, it can be appreciated that when the first and second vent ports did not exist like Comparative Example 3 above, the resin composition is not capable of being prepared and thus the extruding process is not smoothly performed.

In addition, it can be appreciated that when the first thermoplastic resin in a pellet form rather than the first thermoplastic resin in a molten state is used like Comparative Examples 4 to 6 above, the energy consumption per unit, the gel content, and the yellow index are rapidly increased.

According to the preparation method of the thermoplastic resin composition, the energy consumption per unit may be remarkably decreased to reduce a load applied to an extruder motor, thereby reducing the preparation cost.

In addition, since unnecessary energy consumption can be decreased, heat hysteresis of the thermoplastic resin composition occurring during the preparation process may be decreased, such that the thermoplastic resin composition may have a low gel content, and discoloration resistance such as yellow index, or the like, may be improved, whereby a molded product manufactured by using the thermoplastic resin composition may have a remarkably improved appearance.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A preparation method of a thermoplastic resin composition comprising:
    feeding a first thermoplastic resin in a molten state into a first hopper and feeding an impact reinforcing agent including a predetermined content of moisture into a second hopper, followed by kneading and extruding processes, and removing the moisture in a first vent port and a second vent port, wherein the first hopper, the first vent port, the second hopper, a first kneading zone, and the second vent port are sequentially formed in a moving direction of an extruder.

2. The preparation method of claim 1, wherein the first vent port is an opened vent without a separate apparatus, and the second vent port is provided with an apparatus selectively extracting steam only.

3. The preparation method of claim 1, wherein a moisture content W1 removed in the first vent port and a moisture content W2 removed in the second vent port have a weight ratio (W1/W2) of about 0.5 to about 25.

4. The preparation method of claim 1, wherein a moisture content removed in the first vent port corresponds to about 60 to about 90 wt % of the total moisture content of the first thermoplastic resin and the impact reinforcing agent, and a moisture content removed in the second vent port corresponds to about 10 to about 40 wt % of the total moisture content of the first thermoplastic resin and the impact reinforcing agent.

5. The preparation method of claim 1, wherein the first thermoplastic resin is an aromatic vinyl-vinyl cyanide-based copolymer, and the impact reinforcing agent is a rubber-modified vinyl-based graft copolymer.

6. The preparation method of claim 5, wherein the first thermoplastic resin is at least one selected from the group consisting of a styrene-acrylonitrile copolymer, an α-methyl styrene-acrylonitrile copolymer, and a styrene-a-methyl styrene-acrylonitrile copolymer, and the impact reinforcing agent is an acrylonitrile-butadiene-styrene graft copolymer (g-ABS) obtained by graft copolymerization with about 30 to about 70 wt % of a mixture containing an aromatic vinyl-based compound and a vinyl cyanide-based compound in the presence of about 30 to about 70 wt % of a rubber-like polymer, using emulsion polymerization.

7. The preparation method of claim 1, wherein a second kneading zone and a third vent port are further formed after the second vent port.

8. The preparation method of claim 7, wherein the third vent port includes a vacuum vent, and removes at least one selected from the group consisting of residual water, unreacted monomers, oligomers, and decomposition gases.

* * * * *

UNITED STATES PATENT AND TRADEMARK OFFICE
CERTIFICATE OF CORRECTION

PATENT NO. : 9,593,236 B2
APPLICATION NO. : 14/583986
DATED : March 14, 2017
INVENTOR(S) : Jae Keun Hong et al.

It is certified that error appears in the above-identified patent and that said Letters Patent is hereby corrected as shown below:

In the Specification

Column 10, delete Line 67 and insert: -- and Φ=45mm and having a structure shown in FIG. 1, and --

In the Claims

Column 16, Claim 6, delete Line 8 and insert: -- styrene-acrylonitrile copolymer, and a styrene-α-methyl sty- --

Signed and Sealed this
Twenty-seventh Day of March, 2018

Andrei Iancu
*Director of the United States Patent and Trademark Office*